(12) United States Patent
Klingenberg et al.

(10) Patent No.: US 8,037,404 B2
(45) Date of Patent: Oct. 11, 2011

(54) CONSTRUCTION AND ANALYSIS OF MARKUP LANGUAGE DOCUMENT REPRESENTING COMPUTING ARCHITECTURE HAVING COMPUTING ELEMENTS

(75) Inventors: Bernhard J. Klingenberg, Morgan Hill, CA (US); Steven J. Davis, Austin, TX (US); David G. Van Hise, Tucson, AZ (US); James E. Gruener, Topsfield, MA (US); Alisa Neeman, Santa Cruz, CA (US); Emil R. Nunez, Cooper City, FL (US); Nathan L. Williams, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/434,658

(22) Filed: May 3, 2009

(65) Prior Publication Data

US 2010/0281356 A1    Nov. 4, 2010

(51) Int. Cl.
 *G06F 17/00* (2006.01)
(52) U.S. Cl. .................................................. 715/234
(58) Field of Classification Search .................. 715/234; 711/112
 See application file for complete search history.

(56) References Cited

U.S. PATENT DOCUMENTS

| | | | |
|---|---|---|---|
| 5,280,547 A | 1/1994 | Mahoney | |
| 6,205,533 B1 | 3/2001 | Margolus | |
| 6,769,001 B2 | 7/2004 | Halstead, Jr. et al. | |
| 6,950,815 B2 | 9/2005 | Tijare et al. | |
| 6,985,910 B2 | 1/2006 | Hollingsworth | |
| 7,047,253 B1 | 5/2006 | Murthy et al. | |
| 7,107,280 B2 | 9/2006 | Tomic et al. | |
| 2003/0061504 A1 | 3/2003 | Sprigg et al. | |
| 2006/0015431 A1 | 1/2006 | Bugaj et al. | |
| 2006/0248350 A1 | 11/2006 | Stanev | |
| 2007/0043743 A1 | 2/2007 | Chen et al. | |
| 2007/0043751 A1 | 2/2007 | Chen et al. | |
| 2007/0168380 A1 | 7/2007 | Chitrapura et al. | |
| 2010/0281356 A1* | 11/2010 | Klingenberg et al. | 715/234 |

* cited by examiner

*Primary Examiner* — Etienne Leroux

(74) *Attorney, Agent, or Firm* — Feb Cabrasawan

(57) ABSTRACT

A markup language document representing computing elements of a computing architecture, such as data storage elements of a data storage architecture, is constructed and analyzed. A first computing element contained by a second computing element is represented; a first tag of the document corresponding to the first computing element is nested within a second tag of the markup language document corresponding to the second computing element. A non-containing/contained relationship from the first computing element to a third computing element is also represented; a pointer tag of the document corresponding to the data access path is nested within the first tag, and references a third tag of the document corresponding to the third computing element. Get-pointer-node and get-child-node application programming interfaces for the markup language are called to traverse among containing/contained relationships. Pointer tags are followed to traverse among non-containing/contained relationships. Redundant attributes among the relationships can thus be detected.

20 Claims, 6 Drawing Sheets

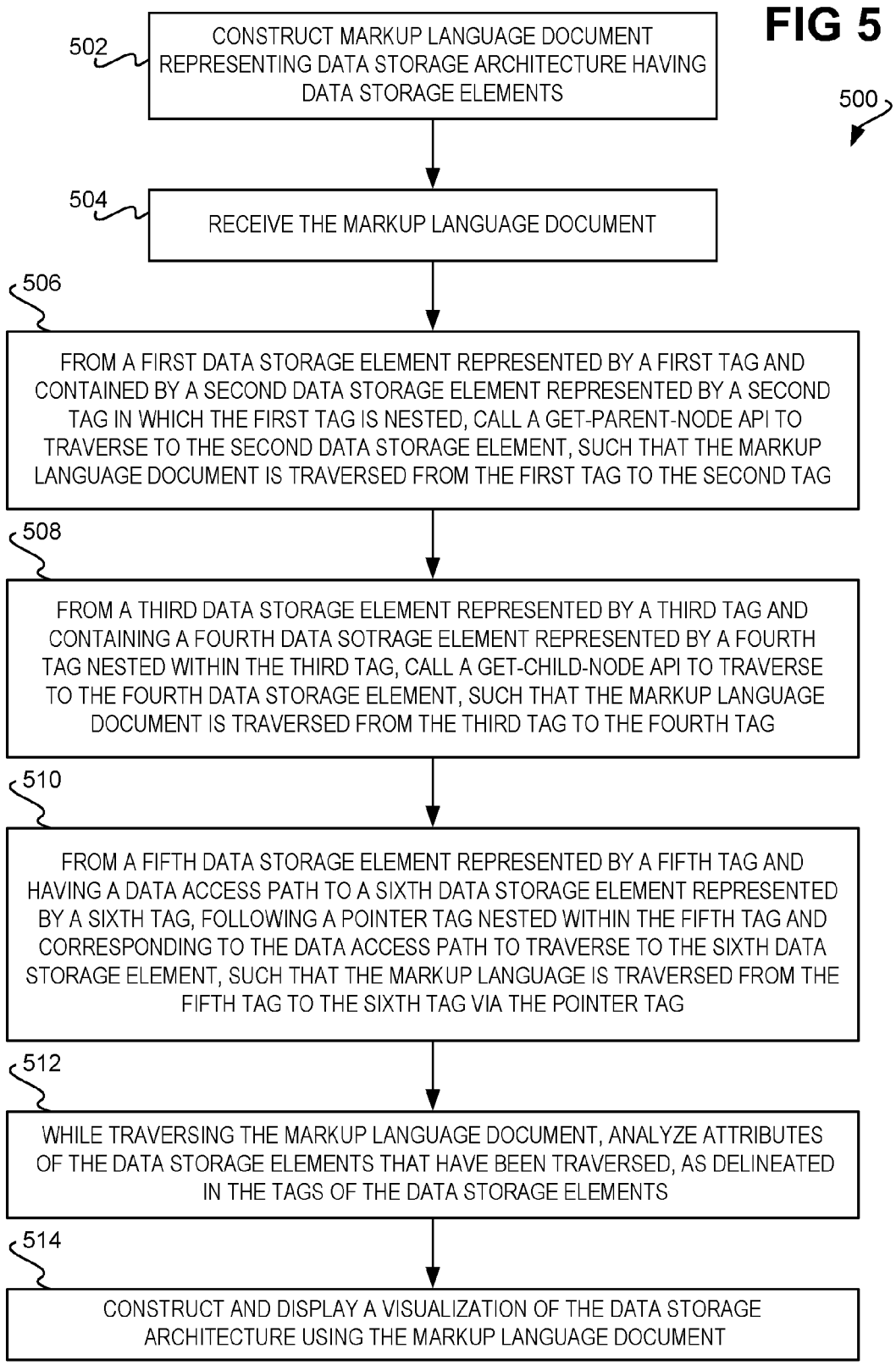

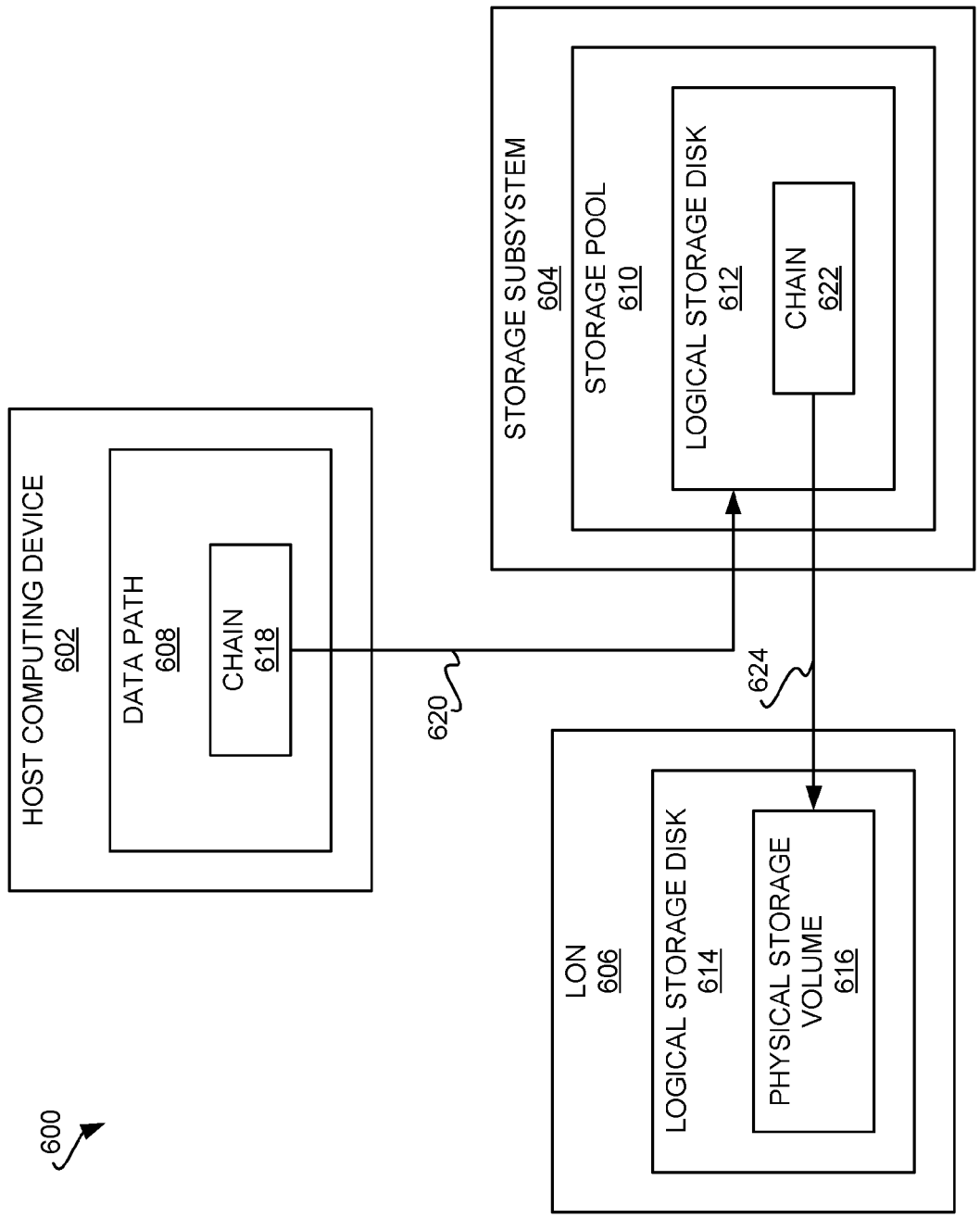

CONSTRUCTION AND ANALYSIS OF MARKUP LANGUAGE DOCUMENT REPRESENTING COMPUTING ARCHITECTURE HAVING COMPUTING ELEMENTS

FIELD OF THE INVENTION

The present invention relates generally to computing architectures having computing elements, such as data storage architectures having data storage elements. The present invention relates particularly to constructing and analyzing a markup language document representing such a computing architecture like a data storage architecture.

BACKGROUND OF THE INVENTION

Large-scale computing architectures made up of computing elements include data storage architecture made up of data storage elements. For example, a number of virtual machines running on a computing device may have virtual file systems with logical data paths, or logical storage volumes, that are implemented by a storage subsystem of the computing device. The storage subsystem of the computing device may itself include a pool of logical storage volumes. As such, the data path of each virtual machine may be implemented on one of the logical storage volumes of the pool of logical storage volumes within the storage subsystem.

The storage subsystem of the computing device may itself be implemented using a storage-array or a storage-area network (SAN), a network-attached storage (NAS), or another type of storage subsystem. In the case of a SAN, the SAN may include a number of logical disks having logical unit numbers (LUN's), where each logical disk is implemented by a physical volume like a physical storage device such as a hard disk drive. Each logical storage volume of the pool of logical storage volumes within the storage subsystem of the computing device may be implemented by multiple physical storage devices. The resulting data storage architecture is thus quite complex, with logical data paths mapping to logical storage volumes, which themselves are mapped to physical storage devices of logical disks of a SAN.

As such, visualizing and analyzing such a data storage architecture can be difficult. This means that undesired redundancies within the data storage architecture may escape detection, such that efficient utilization of data storage resources is not realized. For example, a redundant array of independent disks (RAID) scheme may be employed both in software on the storage subsystem of the computing device, as well as in hardware on the SAN. Such redundant utilization of RAID, however, means that the actual physical storage devices of the SAN are not efficiently employed in an optimal manner, and such inefficient utilization of the SAN's physical storage devices may not be able to be detected by administrators of this data storage architecture.

SUMMARY OF THE INVENTION

The present invention relates to constructing and analyzing a markup language document, such as an eXtended Markup Language (XML) document, representing a computing architecture having computing elements, such as a data storage architecture having data storage elements. A computer-readable medium of an embodiment of the invention has one or more computer programs stored thereon. Execution of the computer programs by one or more processors causes a method to be performed. The method is for representing data storage elements of a data storage architecture.

The method represents a first data storage element being contained by a second data storage element within a markup language document representing the data storage architecture. As such, a first tag of the markup language document and corresponding to the first data storage element is nested within a second tag of the markup language document and corresponding to the second data storage element. The method represents a data access path from the first data storage element to a third data storage element within the markup language document. As such, a pointer tag of the markup language document and corresponding to the data access path is nested within the first tag. The pointer tag references a third tag of the markup language document corresponding to the third data storage element. The method outputs the markup language document representing the data storage architecture.

A method of an embodiment of the invention is for analyzing a data storage architecture having data storage elements. The method is implemented by processor-executable instructions, which may be stored on a computer-readable medium, such as a recordable data storage medium, or another type of tangible computer-readable medium. Execution of the processor-executable instructions by one or more processors of one or more computing devices results in performance of the method.

The method receives a markup language document representing the data storage architecture. A first data storage element is represented by a first tag of the markup language document and is contained by a second data storage element represented by a second tag of the markup language document. The first tag is nested within the second tag within the markup language document. From the first data storage element, the method calls a get-parent-node application programming interface (API) for a markup language to traverse to the second data storage element, such that the markup language document is traversed from the first tag to the second tag.

A third data storage element is represented by a third tag of the markup language document and contains a fourth data storage element represented by a fourth tag of the markup language document. The fourth tag is nested within the first tag within the markup language document. From the third data storage element, the method calls a get-child-node API for the markup language to traverse to the fourth data storage element, such that the markup language document is traversed from the third tag to the fourth tag. While traversing the markup language document, the method analyzes attributes of traversed data storage elements.

Furthermore, in one embodiment, a fifth data storage element is represented by a fifth tag of the markup language document and has a data access path to a sixth data storage element represented by a sixth tag of the markup language document. The method follows a pointer tag of the markup language document nested within the fifth tag and corresponding to the data access path to traverse to the sixth data storage element. As such, the markup language document is traversed from the fifth tag to the sixth tag via the pointer tag.

A computing device of an embodiment of the invention is for representing computing elements of a computing architecture. The computing device includes one or more processors and a computer-readable medium. One or more computer programs are stored on the computer-readable medium and are executable by the processors to perform the following. A first computing element being contained by a second computing element is represented within a markup language document representing the computing architecture. As such, a first tag of the markup language document and corresponding to the first computing element is nested within a second tag of the markup language document and corresponding to the second computing element.

A data access path from the first computing element to a third computing element is also represented within the markup language document. As such, a pointer tag of the markup language document and corresponding to the data access path is nested within the first tag. The pointer tag references a third tag of the markup language document corresponding to the third computing element. The markup language document representing the computing architecture is output.

A computing device of another embodiment of the invention is for analyzing a computing architecture having computing elements. The computing device includes one or more processors and a computer-readable medium. One or more computer programs are stored on the computer-readable medium and are executable by the processors to perform the following. A markup language document representing the computing architecture is received. A first computing element is represented by a first tag of the markup language document and is contained by a second computing element represented by a second tag of the markup language document. The first tag is nested within the second tag within the markup language document. From the first computing element, a get-parent-node application API for a markup language is called to traverse to the second computing element, such that the markup language document is traversed from the first tag to the second tag.

A third computing element is represented by a third tag of the markup language document and contains a fourth computing element represented by a fourth tag of the markup language document. The fourth tag is nested within the first tag within the markup language document. From the third computing element, a get-child-node API for the markup language is called to traverse to the fourth computing element, such that the markup language document is traversed from the third tag to the fourth tag.

A fifth computing element is represented by a fifth tag of the markup language document and has a non-containing/contained relationship to a sixth computing element represented by a sixth tag of the markup language document. From the fifth computing element, a pointer tag of the markup language document nested within the fifth tag and corresponding to the non-containing/contained relationship is followed to traverse to the sixth computing element. As such, the markup language document is traversed from the fifth tag to the sixth tag via the pointer tag. While traversing the markup language document, attributes of traversed computing elements are analyzed.

Embodiments of the present invention realize certain advantages. In particular, the markup language document representing a computing architecture having computing elements, such as a data storage architecture having data storage elements, permits easier visualization and analysis of the architecture. Therefore, inefficiencies within a data storage architecture or other computing architecture can, for instance, be more easily detected, to ensure that the data storage elements or other computing elements are efficiently employed in an optimal manner. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 5 is a flowchart of a method for analyzing a data storage architecture having data storage elements by using a markup language document representing the data storage architecture, according to an embodiment of the present invention.

FIG. 6 is a diagram of an exemplary and representative data storage architecture, according to an embodiment of the invention.

DETAILED DESCRIPTION OF THE DRAWINGS

Figure 1:
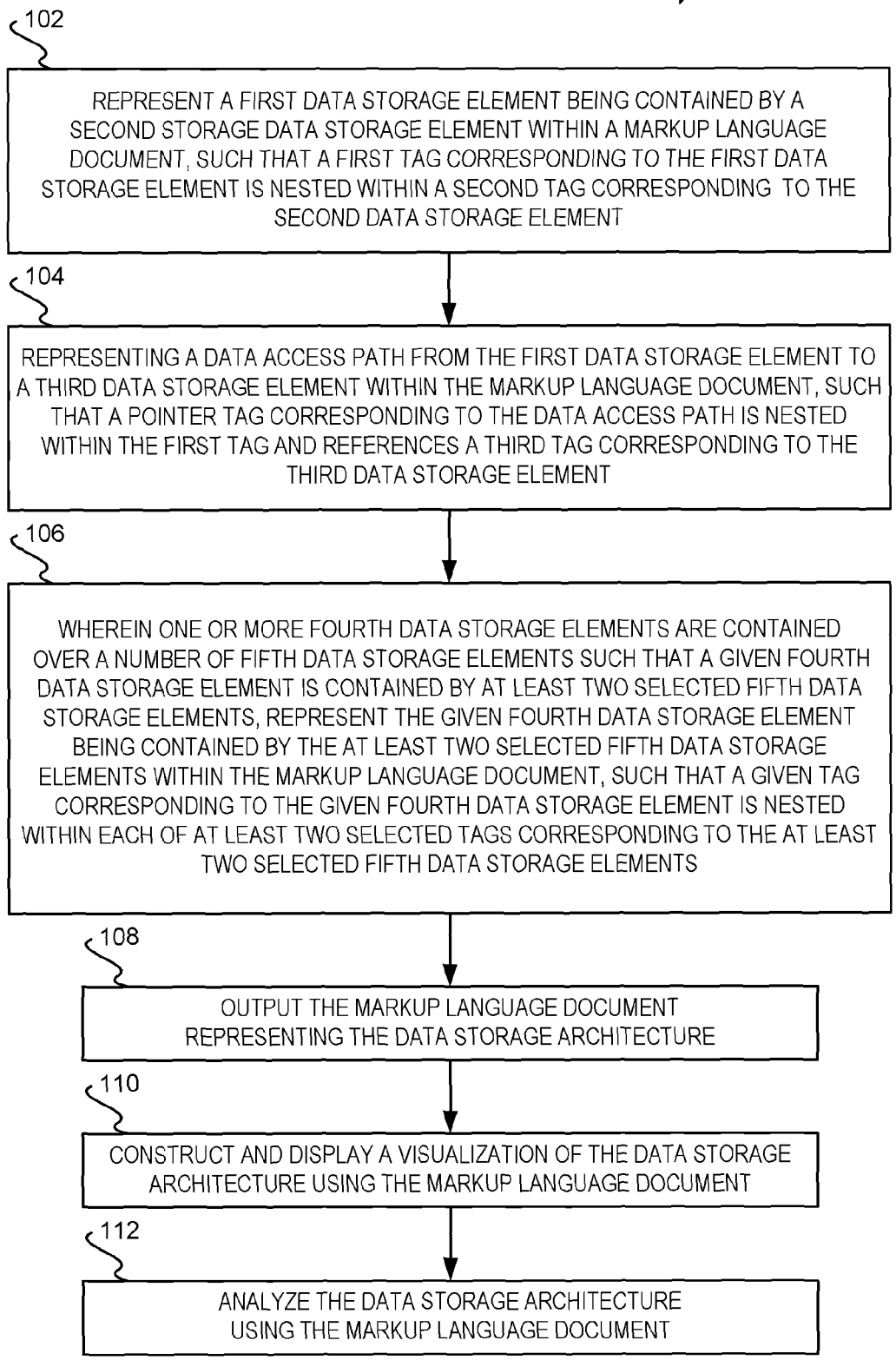
FIG. 1 is a flowchart of a method for constructing a markup language document that represents a data storage architecture having data storage elements, according to an embodiment of the present invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

For instance, the detailed description is exemplarily described in relation to a data storage architecture having data storage elements. However, other embodiments of the present invention may be practiced in relation to other types of computing architectures having other types of computing elements. Examples of such other types of computing architecture elements include memory computing elements, such as cache memory computing elements, as well as network computing elements and virtualized computing elements, among other types of computing architecture elements.

General Embodiments

In this section of the detailed description, general embodiments of the present invention are presented. Thereafter, in the next section of the detailed description, an illustrative exemplary embodiment is presented that informs to great degree how the general embodiments can be employed in the context of a real-world data storage architecture example. This section of the detailed description, by comparison, provides the basic techniques for constructing and analyzing a markup language document representing a data storage architecture having data storage elements, where such techniques are leveraged in the illustrative exemplary embodiment presented in the next section of the detailed description.

The inventors have developed a novel approach to construct a markup language document that represents a computing architecture having computing elements, such as a data storage architecture having data storage elements. Such a markup language document permits relatively easy visualization and analysis of the architecture that the markup language document represents. For example, with respect to a data storage architecture, a redundant array of independent disks (RAID) scheme may be employed both in software and in hardware, which but for the approach developed by the inventors may be difficult to detect. However, the approach developed by the inventors permits such redundant utilization of RAID to be easily detected by administrators of the data storage architecture, by analyzing and/or visualizing the markup language document representing this architecture. As such, the data storage elements within the data storage architecture are used more efficiently, which means that organizations leveraging the inventors' novel approach to constructing a markup language document representing this architecture can realize cost and other savings.

FIG. 1 shows a method 100 for representing data storage elements of a data storage architecture via a markup language document, such that the markup language document represents the data storage architecture, according to an embodiment of the invention. A first data storage element that is contained by a second data storage element is represented within the markup language document (102). As such, a first tag corresponding to the first data storage element is nested within a second tag corresponding to the second data storage element.

Figure 2:
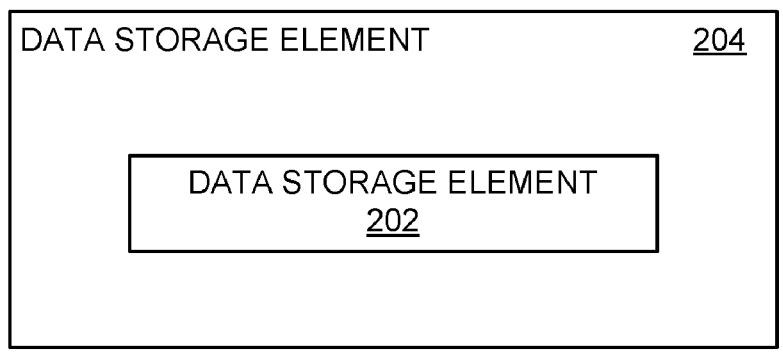
FIGS. 2, 3, 4A, and 4B are diagrams illustratively depicting data storage elements in relation to which parts of the method of FIG. 1 can be performed, or after parts of the method of FIG. 1 have been performed, according to an embodiment of the invention.

FIG. 2 shows an example of two data storage elements 202 and 204 in relation to which part 102 of the method 100 can be performed, according to an embodiment of the invention. The data storage element 202 is contained by the data storage element 204; stated another way, the data storage element 204 contains the data storage element 202. For example, the data storage element 202 may be a logical data path, such as "c:\", "e:\", and so on, of a host computing device like a virtual machine or a physical desktop or laptop computer, while the data storage element 204 may be the host computing device itself. As a second example, the data storage element 202 may be a logical storage volume of a pool of logical storage volumes, while the data storage element 204 may be the pool of logical storage volumes. As a third example, the data storage element 202 may be a physical storage volume of (i.e., implemented by) a logical storage disk, while the data storage element 204 may be the logical storage disk.

The first and the second tags may represent the first and the second data storage elements within the markup language document as follows:

```
<element id = "2222">
    <element id = "1111">
        ...
    </element>
    ...
</element>
```

The first tag having the identifier "1111" and representing the first data storage element is nested within the second tag having the identifier "2222" representing the second data storage element that contains the first data storage element. The markup language in this example is the eXtended Markup Language (XML).

The utilization of nested tags within a markup language document to represent a containing/contained relationship between corresponding data storage elements is innovative, insofar as nested tags within a markup language document are ordinarily employed to represent a hierarchical relationship between corresponding elements. By comparison, rather than using nested tags to represent a hierarchical relationship between corresponding elements, the inventors have instead novelly leveraged nested tags to instead represent a containing/contained relationship between corresponding elements. Utilization of nested tags in such a novel way has heretofore not been accomplished, or recognized as being able to be accomplished.

Referring back to FIG. 1, a data access path from the first data storage element to a third data storage element is represented within the markup language document (104). As such, a pointer tag corresponding to the data access path is nested within the first tag. Furthermore, the pointer tag references a third tag corresponding to the third data storage element. The data access path is more generally a non-contained/containing relationship in one embodiment, in that the third data storage element is not contained by and does not contain the first data storage element.

Figure 3:
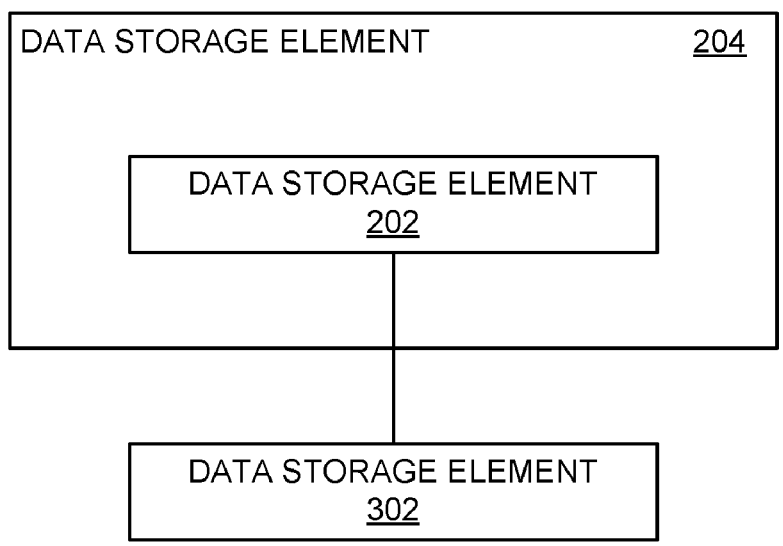

FIG. 3 shows an example of the two data storage elements 202 and 204, as well as a data storage element 302 and a data access path 304 from the data storage element 202 to the data storage element 302, in relation to which part 104 of the method 100 can be performed, according to an embodiment of the invention. As before, the data storage element 202 is contained by the data storage element 204. The data storage element 302 is not contained by and does not contain the data storage element 202.

In one example, the data storage element 202 may be a logical data path, such as "c:\", "e:\", and so on, of a host computing device like a virtual machine or a physical desktop or laptop computer, while the data storage element 204 may be the host computing device itself. In this example, the data storage element 302 may be a logical storage volume of a pool of logical storage volumes, where the logical storage volume in question implements the logical data path of the host computing device. As such, the data access path 304 represents the fact that the data storage element 302 implements the data storage element 202.

In a second example, the data storage element 202 may be a logical storage volume of a pool of logical storage volumes, while the data storage element 204 may be the pool of logical storage volumes. In this example, the data storage element 302 may be a physical storage volume of a logical storage disk, where the physical storage volume implements the logical storage volume. As such, the data access path 304 represents the fact that the data storage element 302 implements the data storage element 202.

The first, second, and third tags may represent the first, second, and third data storage elements, and the pointer tag may represent the data access path from the first element to the third element, within the markup language document as follows:

```
<element id = "2222">
    <element id = "1111">
        <chain type="element" id = "3333" />
        ...
    </element>
    ...
</element>
...
<element id = "3333">
    ...
</element>
```

The first tag having the identifier "1111" and representing the first data storage element is nested within the second tag having the identifier "2222" representing the second data storage element that contains the first data storage element. The third tag having the identifier "3333" and representing the third data storage element is not nested within either the first or the second tag. Rather, the first tag having the identifier "1111" has a special markup language tag, referred to as a pointer tag herein, that acts as a pointer to the third tag having the identifier "3333".

The utilization of a pointer tag within a markup language document, to reference a tag that is not nested within a tag within which the pointer tag is itself nested is innovative, insofar as markup language documents are not ordinarily employed to represent such referential relationships. Rather, markup language documents are typically employed to represent hierarchical relationships among elements. By comparison, the inventors have instead novelly introduced pointer tags that represent non-hierarchical relationships, as well as non-contained/containing relationships, among elements. Utilization of pointer tags has heretofore not been accomplished, or recognized as being able to be accomplished.

Referring back to FIG. 1, one or more fourth data storage elements contained over a number of fifth data storage elements are represented within the markup language document (106), where a given fourth data storage element is contained by at least two selected fifth data storage elements. As such, the given fourth data storage element contained by the at least two selected fifth data storage elements is represented by a given tag that is nested within each of at least two selected tags. The at least two selected tags correspond to the at least two selected fifth data storage elements.

Figure 4A:
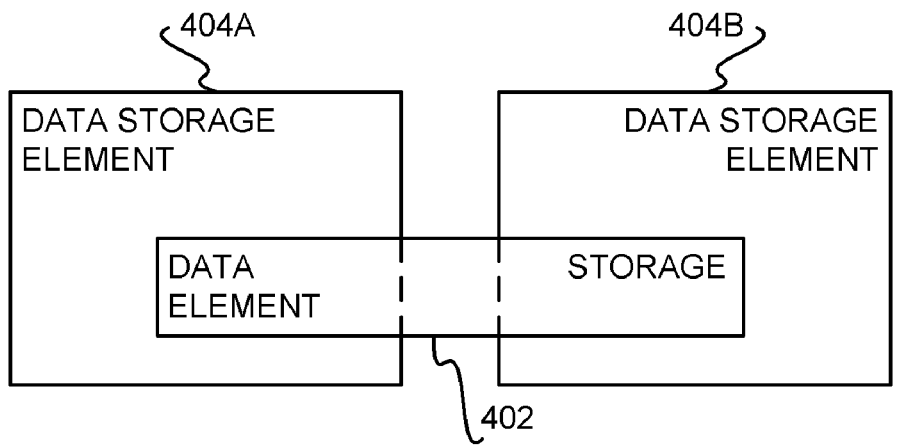

FIG. 4A shows an example of three data storage elements 402, 404A, and 404B in relation to which part 106 of the method 100 can be performed, according to an embodiment of the invention. The data storage element 402 is contained by the data storage elements 404A and 404B, which are collectively referred to as the data storage elements 404. For example, the data storage elements 404 may be logical or virtual disks that are both implemented by the data storage element 402, such as by a physical disk.

The fourth tag may represent the fourth data storage element (e.g., the element 402), and the fifth tags may represent the fifth data storage elements (e.g., the elements 404), within the markup language as follows:

```
<element id = "5551">
    <element id = "4444">
        . . .
    </element>
    . . .
</element>
. . .
<element id = "5552">
    <element id = "4444">
        . . .
    </element>
    . . .
</element>
```

The tag having the identifier "4444" and representing the fourth data storage element is nested within both the tag having the identifier "5551" and representing one of the fifth data storage elements as well as the tag having the identifier "5552" and representing the other of the fifth data storage elements.

Figure 4B:
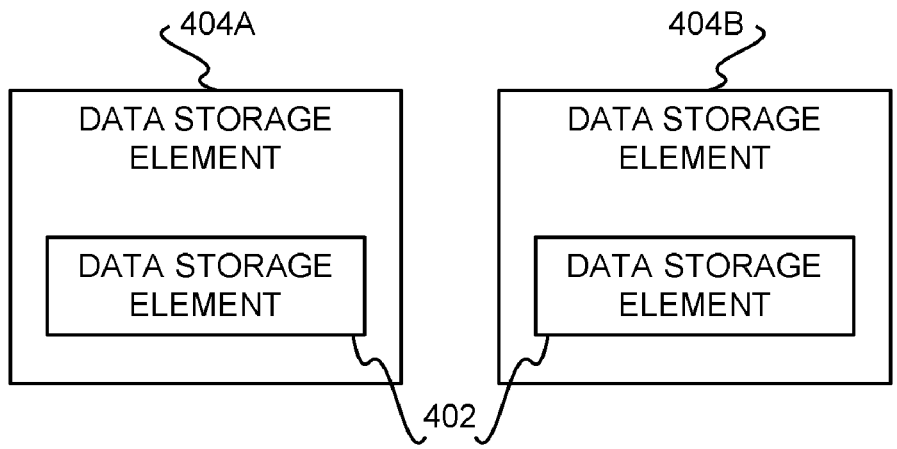

FIG. 4B shows how the data storage elements 402 and 404 of FIG. 4A are thus effectively represented within the markup language document, according to an embodiment of the invention. A tag representing the data storage element 402 is nested within both a tag representing the data storage element 404A as well as a tag representing the data storage element 404B. Thus, although FIG. 4A depicts the actual data storage architecture of the data storage elements 402 and 404, FIG. 4B depicts how this data storage architecture of the data storage elements 402 and 404 is represented within the markup language document using nested tags.

The duplication of a tag representing a contained data storage element within a markup language document, such that the tag is nested within two or more other tags representing containing data storage elements is innovative. Markup languages like XML do not have any provisions for specifying that a data storage element is hierarchically lower than more than one other data storage element at the same level. Therefore, the inventors have had to invent an approach by which a data storage element that is contained by more than one other data storage element can be represented within a markup language. The devised solution, as represented by FIG. 4B, is thus an elegant solution to this shortcoming of markup languages like XML.

Referring back to FIG. 1, once parts 102, 104, and 106 have been performed in relation to the data storage elements of a data storage architecture as appropriate, the method 100 outputs the markup language document that has been generated (108). The markup language document thus represents the data storage architecture. Output can be achieved in a number of different ways. For example, the markup language document may be stored on a computer-readable medium, it may be transmitted to a different computing device than the computing device that performed parts 102, 104, and 106, and/or the document may be displayed on a display device for viewing by a user.

A visualization of the data storage architecture can further be constructed from the markup language document and displayed on a display device for viewing by a user (110). In one embodiment, existing visualization techniques may be employed in part 110. For example, visualization techniques used by storage resource management software, such as TotalStorage® Productivity Center software, available from International Business Machines, Inc., of Armonk, N.Y., can be employed. Finally, the data storage architecture can be analyzed and/or optimized using the markup language document that has been constructed (112), as is now described in more detail.

FIG. 5 shows a method 500 for analyzing a data storage architecture having data storage elements represented as tags within a markup language document representing the data storage architecture, according to an embodiment of the invention. The markup language document representing the data storage architecture having the data storage elements is initially constructed (502). For example, the method 100 of FIG. 1 can be employed to construct the markup language document.

The markup language document is then received (504). For example, the markup language document may be read as data from a computer-readable medium, such as a volatile memory or a non-volatile storage like a hard disk drive. The markup language document may also be received by receiving data over a network, such as the Internet, a local-area network (LAN), a wide-array network (WAN), a wireless network, a wired network, and/or another type of network.

A get-parent-node application programming interface (API) is called to traverse the data storage architecture from a first data storage element to a second data storage element (506). The first data storage element is represented by a first tag within the markup language document that is nested within a second tag representing the second data storage element within the markup language document. As such, the markup language document is traversed from the first tag to the second tag.

The get-parent-node API may be an API that is available and callable within markup language processing software, such as XML processing software. An example of XML processing software that exposes a get-parent-node API is the W3C Document Object Model (DOM), available on the Internet at www.w3.org. For example, a function such as element-.getParentNode( ) available within the W3C DOM may be used as the get-parent-node API in part 506.

The traversal of the markup language document in part 506 of the method 500 is exemplarily described in relation to the data storage elements 202 and 204 of FIG. 2. The data storage element 202 is represented by a tag that is nested within a tag representing the data storage element 204. Therefore, the get-parent-node API can be called to traverse the markup language document from the tag representing the data storage element 202 to the tag representing the data storage element 204.

Referring back to FIG. 5, a get-child-node API is called to traverse the data storage architecture from a third data storage element to a fourth data storage element (508). The third data storage element is represented by a third tag within the markup language document in which a fourth tag representing the fourth data storage element within the markup language document is nested. As such, the markup language document is traversed from the third tag to the fourth tag.

The get-child-node API may be an API that is available and callable within markup language processing software, such as XML processing software. For example, the W3C DOM exposes such a get-child-node API. Particularly, a function such as element.getChildNodes( ) available within the W3C DOM may be used as the get-child-node API in part 508. It is noted that the get-child-node API, such as the function element.getChildNodes( ), typically returns all the elements that are contained by a given element. That is, the get-child-node API typically returns all the tags representing elements that are nested within a given tag representing a given element.

The traversal of the markup language document in part 508 of the method 500 is also exemplarily described in relation to the data storage elements 202 and 204 of FIG. 2. The data storage element 204 is represented by a tag within which a tag representing the data storage element 202 is nested. Therefore, the get-child-node API can be called to traverse the markup language document from the tag representing the data storage element 204 to the tag representing the data storage element 202.

Referring back to FIG. 5, a pointer tag representing a data access path can be followed within the markup language document to traverse the data storage architecture from a fifth data storage element to a sixth data storage element (510). The fifth data storage element is represented by a fifth tag within the markup language document and the sixth data storage element is represented by a sixth tag within the markup language document. The fifth tag may not be nested within the sixth tag, and vice-versa. The pointer tag is nested within the fifth tag and references the sixth tag. As such, the markup language document is traversed from the fifth tag to the sixth tag via the pointer tag.

To perform part 510, in one embodiment, the child elements of the type chain are first delineated by using an appropriate API, such as the W3C DOM API element.getElements-byTagName (Constants. CHAIN). Each chain element has two attributes, type and identifier. Therefore, a search is performed across the markup language hierarchy for elements of the type CHAIN, to locate the element having the matching identifier.

The traversal of the markup language document in part 510 of the method 500 is exemplarily described in relation to the data storage elements 202 and 302 of FIG. 3. The data storage element 202 is represented by a tag, as is the data storage element 302. The data storage element 202 is contained by the data storage element 204, such that the tag representing the element 202. The data access path 304 from the data storage element 202 to the data storage element 302 is represented by a pointer, or chain, tag that is nested within the tag representing the element 202 and that references the tag representing the element 302. Therefore, following this pointer tag results in traversal of the markup language document from the tag representing the data storage element 202 to the tag representing the data storage element 302.

For example, the data storage elements 202, 204, and 302 may be represented by tags within the markup language document as follows.

```
<element id = "0204">
    <element id = "0202">
        <chain type="element" id = "0302" />
        ...
    </element>
    ...
</element>
...
<element id = "0302">
    ...
</element>
```

From the tag representing the data storage element 202, the W3C DOM API element.getElementsbyTagName (Constants.CHAIN) may be called to retrieve the chain element (i.e., the pointer tag) referencing the data storage element 302 having the identifier "0302". Thereafter, the markup language document is searched to locate the tag representing the data storage element 302. In this way, the markup language document is traversed from the tag representing the data storage element 202 to the tag representing the data storage element 302, via the pointer tag representing the data access path 304 from the element 202 to the element 302.

Referring back to FIG. 5, while the markup language document is being traversed, attributes of the data storage elements that have been traversed, as delineated within the tags of the data storage elements, are analyzed (512). Such attributes can include various redundant array of independent disk (RAID) attributes, for instance. For example, various data storage elements may have attributes indicating whether RAID is being performed, and how it is being performed, such as via striping (RAID0), mirroring (RAID1), parity (RAID5), and so on.

Furthermore, based on whether a data storage element is a logical or virtual data storage element or a physical hardware data storage element, it can be determined whether RAID is being implemented on a software or a hardware level. That is, RAID being implemented in relation to logical or virtual data storage elements means that software RAID is being performed, whereas RAID being implemented in relation to physical hardware data storage elements means that hardware RAID is being performed. Finally, a visualization of the data storage architecture may be constructed and displayed using the markup language document (514), as has been described in relation to part 110 of the method 100 of FIG. 1.

Thus, analyzing and optimizing a data storage architecture using a markup language document that represents this architecture can include acquiring the attributes of the data storage elements of the data storage architecture, by traversing the markup language document. It can be determined whether the attributes of the data storage elements implement redundant characteristics within the storage architecture. For example, such redundant characteristics can include the fact that RAID is being implemented both on a software level and on a hardware level. Where it has been determined that the attributes of the data storage elements implement such redundant characteristics, the data storage architecture can be modified to remove these redundant characteristics. For example, if RAID is being implemented both on a software level and on a hardware level, the data storage architecture may be modified so that RAID is implement just on a software level, or just on a hardware level, and not both on a software level and on a hardware level.

Exemplary Embodiment

FIG. 6 shows an exemplary data storage architecture 600, according to an embodiment of the invention, and in relation to which the methods 100 and 500 of FIGS. 1 and 5 can be performed. The data storage architecture 600 includes a host computing device 602, a storage subsystem 604, and a logical unit number (LUN) 606. For instance, the host computing device 602 may be a virtual machine (VM) in one embodiment. Within a markup language document, there are tags representing the host computing device 602, the storage subsystem 604, and the LUN 606, where these tags are not nested in relation to one another.

The host computing device 602 is a data storage element that contains a data storage element that is specifically a data path 608, like "c:\", "e:\", and so on. As such, a tag representing the data path 608 within the markup language document is nested within the tag representing the host computing device 602. The storage subsystem 604 is a data storage element that contains a data storage element that is specifically a storage pool of logical storage volumes 610. As such, a tag representing the storage pool 610 within the markup language document is nested within the tag representing the storage subsystem 604. The storage pool 610 contains a data storage element that is specifically a logical storage volume 612. As such, a tag representing the logical storage volume 612 within the markup language document is nested within the tag representing the storage pool 610.

The LUN 606 is a data storage element that contains a data storage element that is specifically a logical storage disk 614. As such, a tag representing the logical storage disk 614 within the markup language document is nested within the tag representing the LUN 606. The logical storage disk 614 contains a data storage element that is specifically a physical storage volume 616. As such, a tag representing the physical storage volume 616 within the markup language document is nested within the tag representing the logical storage disk 614.

The tag within the markup language document representing the data path 608 of the host computing device 602 includes a pointer, or chain, tag 618 that represents a data access path 620 to the logical storage volume 612 of the storage pool 610 of the storage subsystem 604. The pointer tag 618 is nested within the tag representing the data path 608 within the markup language document. The data access path 620 represents the fact that the data path 608 is implemented by the logical storage volume 612.

The tag within the markup language document representing the logical storage volume 612 of the storage pool 610 of the storage subsystem 604 includes a pointer, or chain, tag 622 that represents a data access path 624 to the physical storage volume 616 of the logical storage disk 614 of the LUN 606. The pointer tag 622 is nested within the tag representing the logical storage disk 614 within the markup language document. The data access path 624 represents the fact that the logical storage volume 612 is implemented by the physical storage volume 616.

The markup language document that has been described in relation to the data storage architecture 600 is constructed by performing the method 100 of FIG. 1. Furthermore, the data storage architecture 600 can be analyzed by performing the method 500 of FIG. 5 in relation to this markup language document. For example, the pointer tag 618 can be followed to determine that the data path 608 is implemented by the logical storage volume 612, and the attributes of the logical storage volume 612 can then be analyzed. Because the logical storage volume 612 is a virtual entity, any redundant array of independent disks (RAID) characteristics associated with the volume 612 are known to be implemented at a software level.

Next, the markup language document can be traversed from the logical storage volume 612 to its parent node, the storage pool 610, and the attributes of the storage pool 610 can be analyzed. Any RAID characteristics associated with the storage volume 610 may be known to be implemented at a hardware level. Thus, redundant software and hardware RAID characteristics can be detected by comparing the RAID characteristics associated with the logical storage volume 612, if any, with the RAID characteristics associated with the storage pool 610, if any.

Furthermore, it can be verified that the logical storage volume 612 is ultimately implemented via a LUN, by following the pointer tag 622 to the physical storage volume 616, obtaining the parent node of the volume 616, which is the logical storage disk 614, and then by obtaining the parent node of the disk 614, which is the LUN 606. A LUN is a more general virtualization layer that can contain logical storage disks, such as the logical storage disk 614, which may be implemented by physical storage volumes, such as the physical storage volume 616. The attributes of the logical storage disk 614 of the LUN 606 and/or of the physical storage volumes 616 (ultimately of the LUN 606) may be retrieved and analyzed to determine if any reflect RAID characteristics, to further determine whether there are redundant RAID characteristics within the data storage architecture 600.

It is noted that such a visualization of a data storage architecture, as in FIG. 6, by using a markup language document provides for advantages over competing such visualizations within the prior art. For example, some types of visualization software can display a visualization of computing architectures like the data storage architecture 600. However, the lines, or edges, between components displayed within such a visualization do not indicate the relationships between these components. By comparison, in the visualization of FIG. 6, the lines between components do indicate the relationships between these components. For example, the data access path 620 represented by the pointer tag 618 indicates that the data path 608 is implemented by the logical storage volume 612. Likewise, the data access path 624 represented by the pointer tag 622 indicates that the logical storage volume 612 is implemented by the physical storage volume 616.

Representative Computing Device and Conclusion

Figure 7:
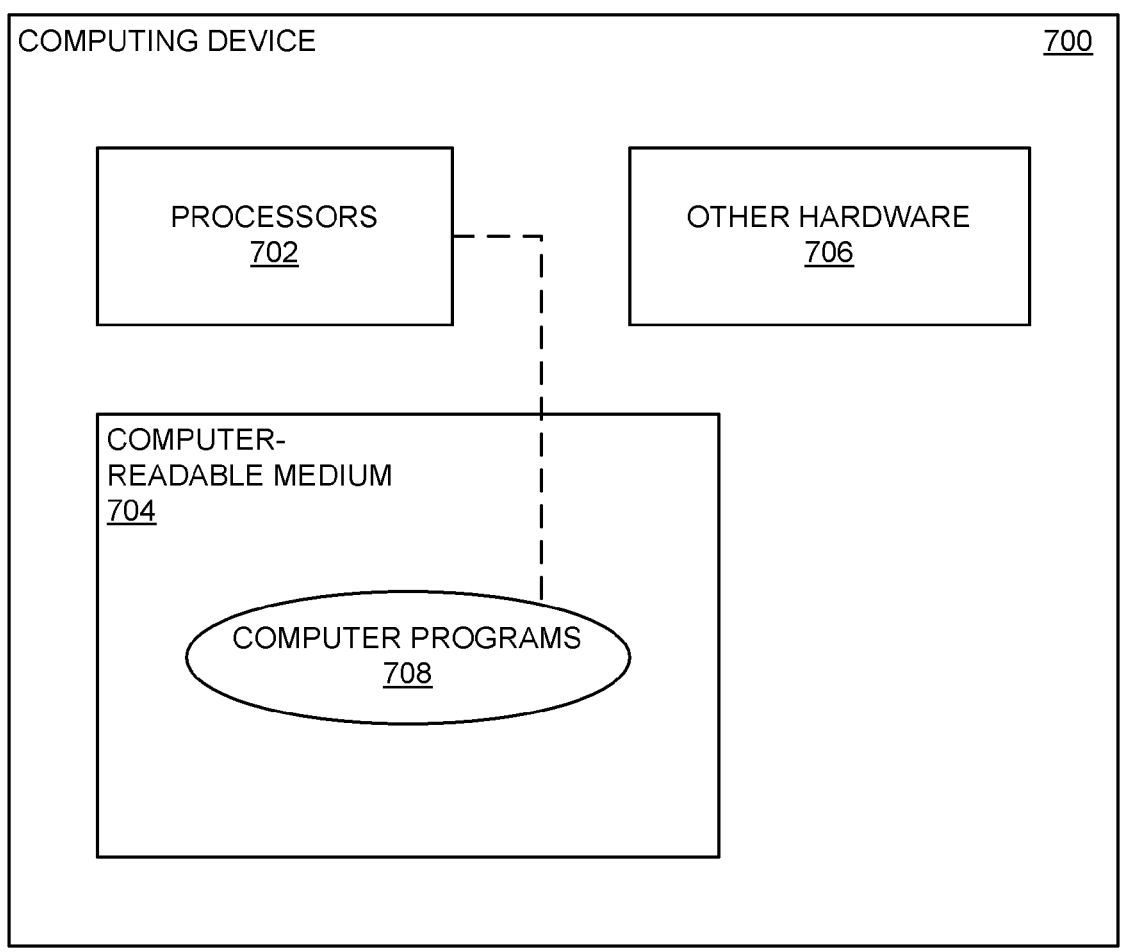
FIG. 7 is a diagram of a representative computing device, according to an embodiment of the invention.

FIG. 7 shows a representative computing device 700, according to an embodiment of the invention. The computing device 700 includes one or more processors 702, a computer-readable medium 704, and other hardware 706. The computer-readable medium 704 can be a volatile semiconductor memory, a non-volatile storage device like a hard disk drive, and/or another type of computer-readable medium. The other hardware 706 can include network adapters, display devices, and other types of hardware commonly found in a computing device. As such, the computing device 700 may be a desktop computer, a laptop computer, or another type of physical computing device.

The computer-readable medium 704 stores one or more computer programs 708 that are executed by the processors 702, as indicated by the dotted line 710. Execution of the computer programs 708 by the processors 702 from the computer-readable medium 704 results in the performance of one or more methods. Such methods can include the method 100 of FIG. 1 and/or the method 500 of FIG. 5 that have been described.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A computer-readable medium having one or more computer programs stored thereon, wherein execution of the computer programs by one or more processors causes a method to be performed, the method for representing data storage elements of a data storage architecture, the method comprising:
representing a first data storage element being contained by a second data storage element within a markup language document representing the data storage architecture, such that a first tag of the markup language document and corresponding to the first data storage element is nested within a second tag of the markup language document and corresponding to the second data storage element;
representing a data access path from the first data storage element to a third data storage element within the markup language document, such that a pointer tag of the markup language document and corresponding to the data access path is nested within the first tag, the pointer tag referencing a third tag of the markup language document, the third tag corresponding to the third data storage element; and,
outputting the markup language document representing the data storage architecture.

2. The computer-readable medium of claim 1, wherein the first data storage element is a logical data path of a host computing device and the second data storage element is the host computing device.

3. The computer-readable medium of claim 2, wherein the third data storage element is a logical storage volume of a pool of logical storage volumes, the logical storage volume implementing the logical data path of the host computing device, the data access path representing that the logical storage volume implements the logical data path.

4. The computer-readable medium of claim 1, wherein the first data storage element is a logical storage volume of a pool of logical storage volumes, and the second data storage element is the pool of logical storage volumes.

5. The computer-readable medium of claim 4, wherein the third data storage element is a physical storage volume of a logical storage disk, the physical storage volume implementing the logical storage volume, the data access path representing that the physical storage volume implements the logical storage volume.

6. The computer-readable medium of claim 1, wherein the first data storage element is a physical storage volume of a logical storage disk, and the second data storage element is the logical storage disk.

7. The computer-readable medium of claim 1, the method further comprising:
where one or more fourth data storage elements are contained over a plurality of fifth data storage elements within the data storage architecture such that a given fourth data storage element is contained by at least two selected fifth data storage elements,
representing the given fourth data storage element being contained by the at least two selected fifth data storage elements within the markup language document, such that a given tag of the markup language document and corresponding to the given fourth data storage element is nested within each of at least two selected tags of the markup language document and corresponding to the at least two selected fifth data storage elements.

8. The computer-readable medium of claim 1, the method further comprising constructing and displaying a visualization of data storage architecture using the markup language document that has been output.

9. The computer-readable medium of claim 1, the method further comprising analyzing and optimizing the data storage architecture using the markup language document that has been output,
wherein analyzing and optimizing the data storage architecture using the markup language document comprises:
acquiring attributes of the data storage elements of the data storage architecture by traversing the markup language document;
determining whether the attributes of the data storage elements implement redundant characteristics within the data storage architecture; and,
where the attributes of the data storage elements implement redundant characteristics within the data storage architecture, modifying the data storage architecture to remove the redundant characteristics.

10. A method for analyzing a data storage architecture having data storage elements, the method implemented by processor-executable instructions, such that execution of the processor-executable instructions by one or more processors of one or more computing devices resulting in performance of the method, the method comprising:
receiving a markup language document representing the data storage architecture;
from a first data storage element represented by a first tag of the markup language document and contained by a second data storage element represented by a second tag of the markup language document, the first tag nested within the second tag within the markup language document,
calling a get-parent-node application programming interface (API) for a markup language to traverse to the second data storage element, such that the markup language document is traversed from the first tag to the second tag;
from a third data storage element represented by a third tag of the markup language document and containing a fourth data storage element represented by a fourth tag of the markup language document, the fourth tag nested within the first tag within the markup language document, calling a get-child-node API for the markup language to traverse to the fourth data storage element, such that the markup language document is traversed from the third tag to the fourth tag; and, while traversing the markup language document, analyzing attributes of traversed data storage elements.

11. The method of claim 10, wherein the third data storage element is a host computing device and the fourth data storage element is a logical data path of the host computing device.

12. The method of claim 10, wherein the first data storage element is a logical storage volume of a pool of logical storage volumes, and the second data storage element is the pool of logical storage volumes.

13. The method of claim 10, wherein the third data storage element is a logical storage disk, and the fourth data storage element is a physical storage volume of the logical storage disk.

14. The method of claim 10, further comprising:

from a fifth data storage element represented by a fifth tag of the markup language document and having a data access path to a sixth data storage element represented by a sixth tag of the markup language document, following a pointer tag of the markup language document nested within the fifth tag and corresponding to the data access path to traverse to the sixth data storage element, such that the markup language document is traversed from the fifth tag to the sixth tag via the pointer tag.

15. The method of claim 14, wherein the fifth data storage element is a logical data path of a host computing device, and the sixth data storage element is a logical storage volume implementing the logical data path of the host computing device, the data access path representing that the logical storage volume implements the logical data path.

16. The method of claim 14, wherein the fifth data storage element is a logical storage volume of a pool of logical storage volumes, and the sixth data storage element is a physical storage volume of a logical storage disk, the physical storage volume implementing the logical storage volume, the data access path representing that the physical storage volume implements the logical storage volume.

17. The method of claim 10, further comprising constructing and displaying a visualization of data storage architecture using the markup language document that has been analyzed.

18. The method of claim 10, further comprising constructing the markup language document in which the data storage elements of the data storage architecture are represented.

19. A computing device for representing computing elements of a computing architecture, the computing device comprising:

one or more processors;
a computer-readable medium; and,
one or more computer programs stored on the computer-readable medium and executable by the processors to:
represent a first computing element being contained by a second computing element within a markup language document representing the computing architecture, such that a first tag of the markup language document and corresponding to the first computing element is nested within a second tag of the markup language document and corresponding to the second computing element;

represent a data access path from the first computing element to a third computing element within the markup language document, such that a pointer tag of the markup language document and corresponding to the data access path is nested within the first tag, the pointer tag referencing a third tag of the markup language document, the third tag corresponding to the third computing element; and, output the markup language document representing the computing architecture.

20. A computing device for analyzing a computing architecture having computing elements, the computing device comprising:

one or more processors;
a computer-readable medium; and,
one or more computer programs stored on the computer-readable medium and executable by the processors to:
receive a markup language document representing the computing architecture;
from a first computing element represented by a first tag of the markup language document and contained by a second computing element represented by a second tag of the markup language document, the first tag nested within the second tag within the markup language document,
call a get-parent-node application programming interface (API) for a markup language to traverse to the second computing element, such that the markup language document is traversed from the first tag to the second tag;
from a third computing element represented by a third tag of the markup language document and containing a fourth computing element represented by a fourth tag of the markup language document, the fourth tag nested within the first tag within the markup language document,
call a get-child-node API for the markup language to traverse to the fourth computing element, such that the markup language document is traversed from the third tag to the fourth tag;
from a fifth computing element represented by a fifth tag of the markup language document and having a non-containing/contained relationship to a sixth computing element represented by a sixth tag of the markup language document,
follow a pointer tag of the markup language document nested within the fifth tag and corresponding to the non-containing/contained relationship to traverse to the sixth computing element, such that the markup language document is traversed from the fifth tag to the sixth tag via the pointer tag; and,
while traversing the markup language document, analyze attributes of traversed computing elements.

* * * * *